May 23, 1939.　　　H. G. EVANS ET AL　　　2,159,614
IMAGE PROJECTION CABINET
Filed April 10, 1937　　　3 Sheets-Sheet 1
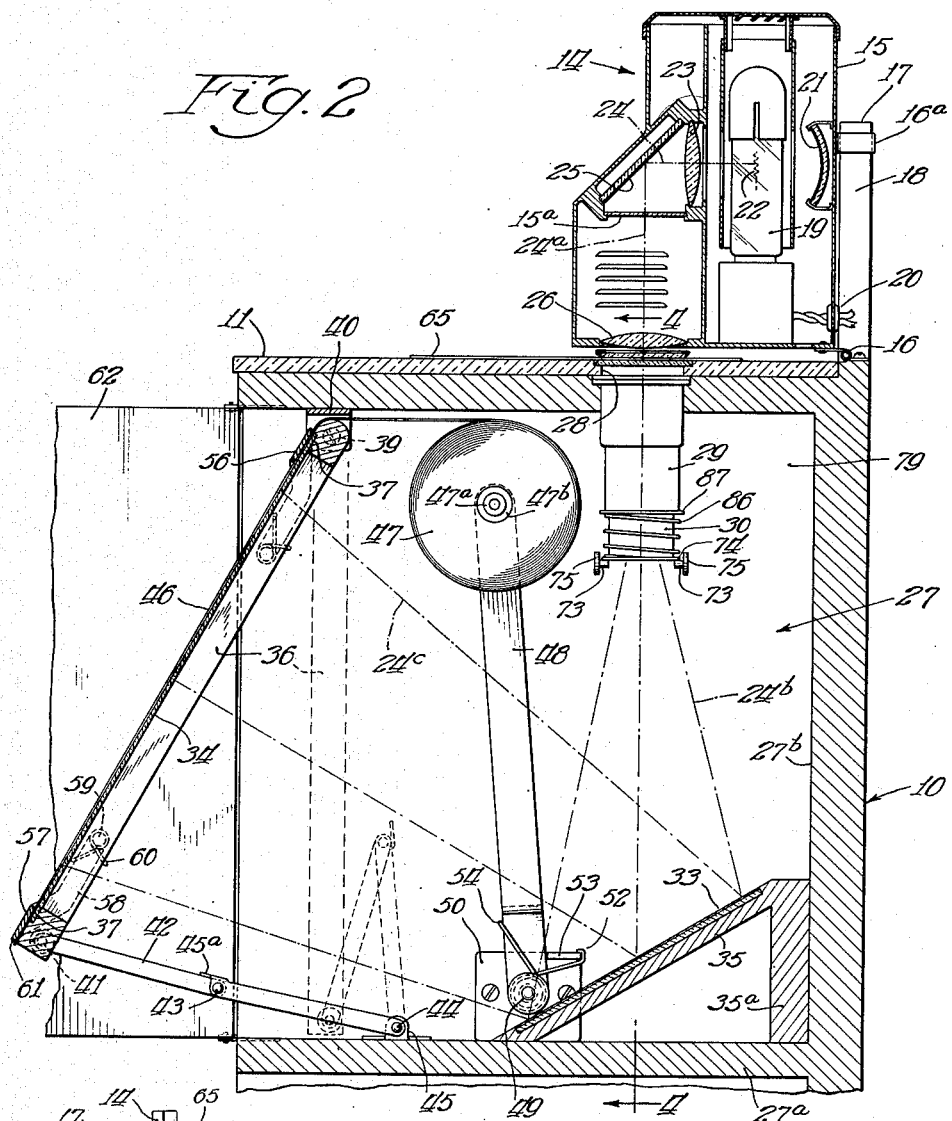
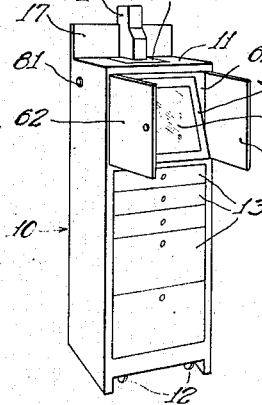
Inventors:
Howell G. Evans and
Bertel J. Kleerup.
By: A. Trevor Jones
Atty.

May 23, 1939.　　H. G. EVANS ET AL　　2,159,614
IMAGE PROJECTION CABINET
Filed April 10, 1937　　3 Sheets-Sheet 2
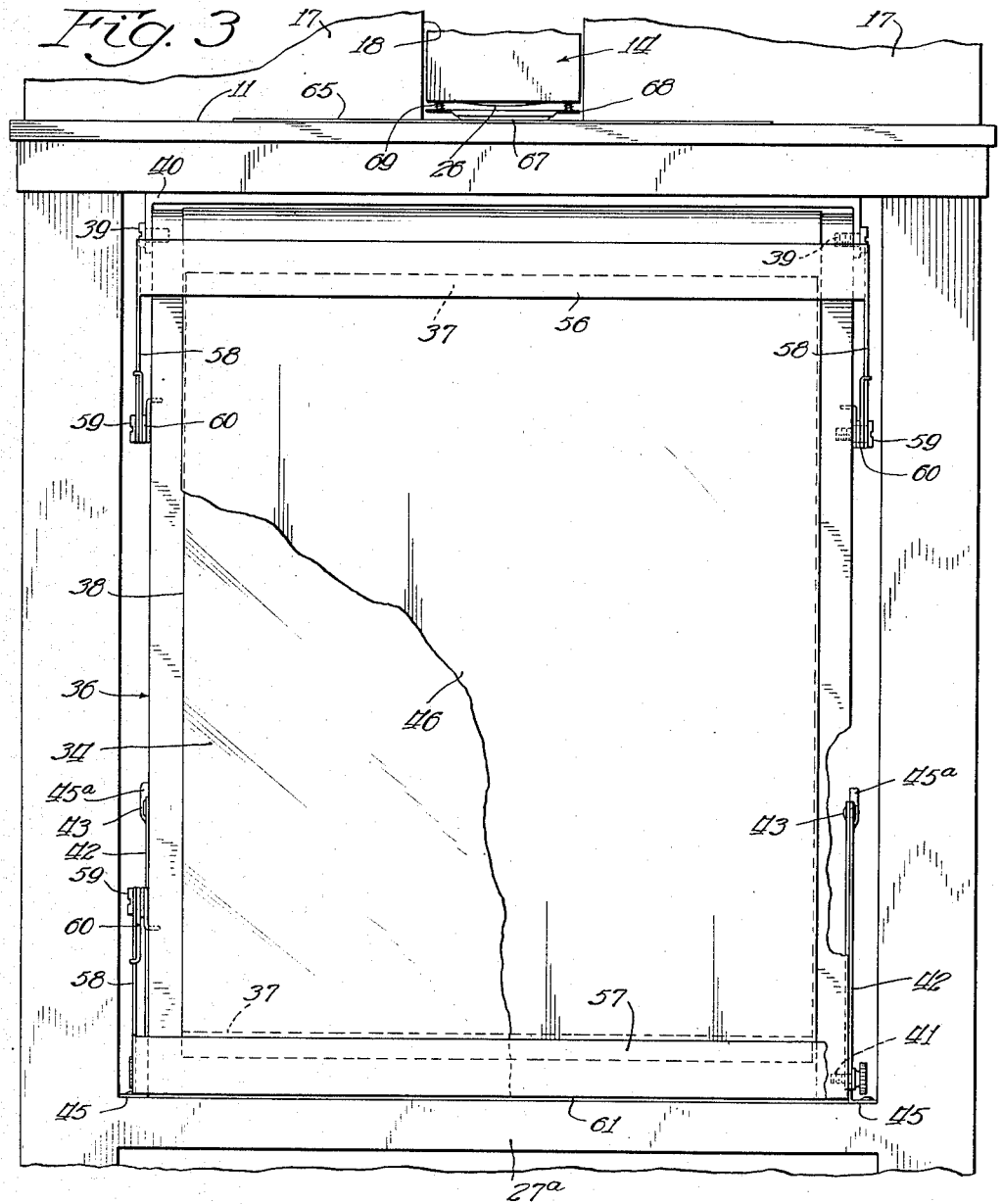
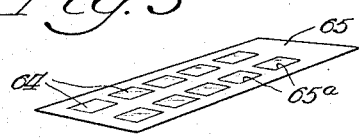
Inventors:
Howell G. Evans and
Bertel J. Kleerup.
By A. Trevor Jones
Atty.

May 23, 1939.  H. G. EVANS ET AL  2,159,614
IMAGE PROJECTION CABINET
Filed April 10, 1937   3 Sheets-Sheet 3

Inventors:
Howell G. Evans and
Bertel J. Kleerup.
By: A. Trevor Jones
Atty.

Patented May 23, 1939

2,159,614

UNITED STATES PATENT OFFICE 2,159,614

IMAGE PROJECTION CABINET

Howell G. Evans, Two Rivers, Wis., and Bertel J. Kleerup, Chicago, Ill., assignors to Hamilton Manufacturing Company, Two Rivers, Wis., a corporation of Wisconsin Application April 10, 1937, Serial No. 136,088

5 Claims. (Cl. 88—24)

This invention relates to image projection and is inclusive of a projection lantern and screen associated with a cabinet or the like, in a compact, unitary assembly.

The invention is of particular utility embodied, as here shown, for purposes of exemplification, in a portable cabinet, for use by dentists to display X-ray pictures to their patients, the patient being able to see an enlargement of X-rays of the patient's own teeth, for example, and the dentist being able to illustrate to the patient by reference to the enlarged X-ray picture his remarks with reference thereto. Heretofore the X-ray picture has been almost entirely for the guidance of the dentist and of little meaning or interest to the patient. Also the dentist may display, if desired, other films or slides such as to illustrate a short talk on the care of teeth and the dangers resulting from lack of proper attention thereto, the latter being of special interest to children to enlist their cooperation in the work of the dentist.

An important object of the invention is the provision of a replaceable screen upon which the dentist may sketch a proposed prevention or rehabilitation program for a particular tooth of the patient while the enlargement is clearly visible to the patient, and the supplementary sketch by the dentist appears in conjunction therewith on the screen. Thereafter the portion of the screen so sketched may even be removed and placed in the dentist's files or given to the patient. For the purpose of thus sketching on the screen the hand of the dentist advantageously is not disposed between the film and the projected image, since the light beam, as here contemplated comes from the rear of the screen.

A further object of the invention is the feature of utilizing the top surface of the cabinet as an operative part of the projector device, the dentist, in accordance with the present invention, being able to slide the X-ray film or the like over the top surface of the cabinet quickly and readily into position for projecting.

Other objects and advantages will be apparent from the following description, taken together with the accompanying drawings, in which:—

Figure 1 is a general perspective view of a cabinet embodying the present invention;

Figure 2 is an enlarged fragmentary sectional view from front to rear of the upper portion of the cabinet;

Figure 3 is a fragmentary front elevational view of the structure of Fig. 2 with parts broken away for descriptive purposes;

Figure 5 is a perspective view of a conventional X-ray picture mount which may be employed with the invention.

Figure 4:
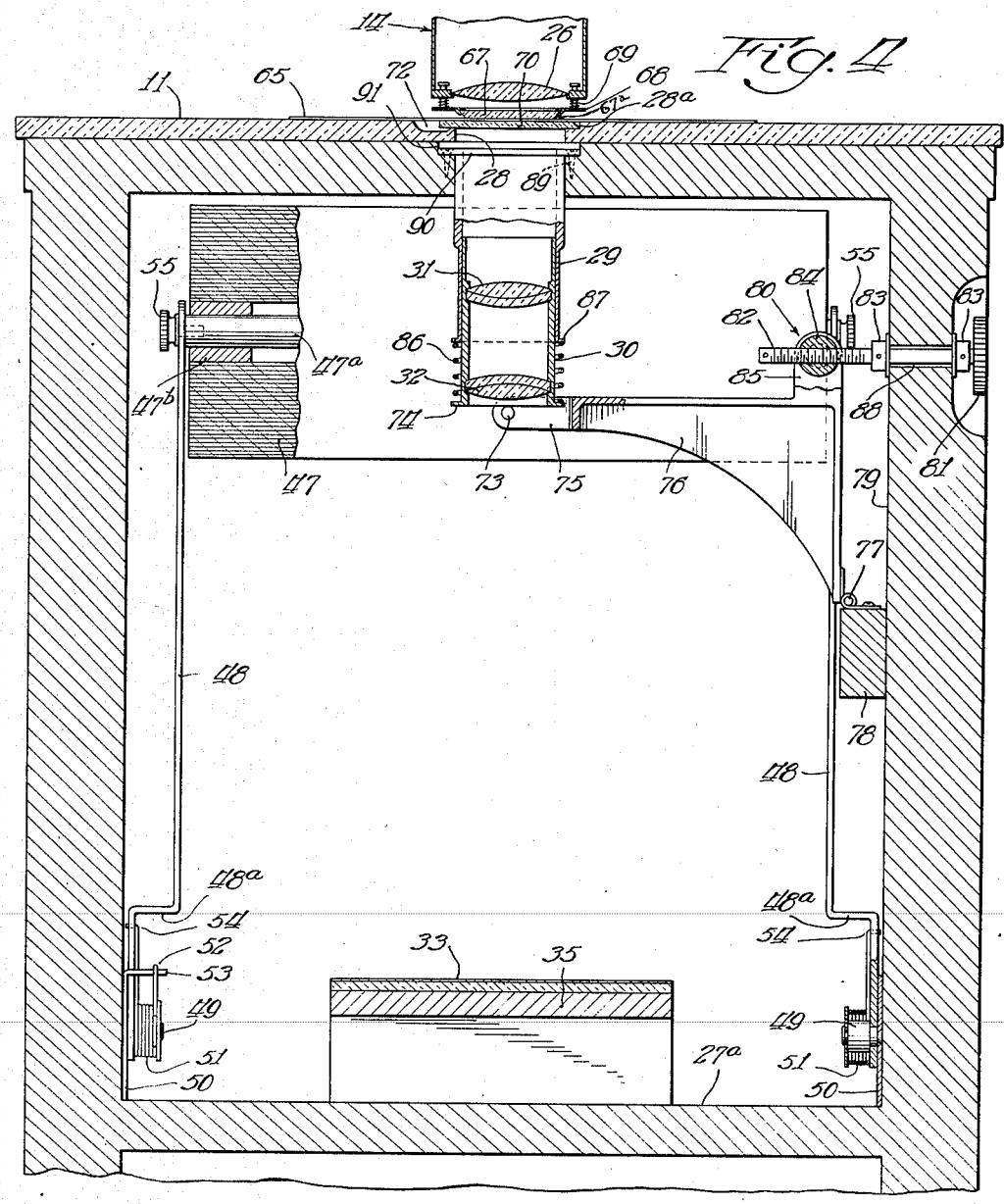
Figure 4 is a cross-section taken on the line 4—4 of Fig. 2.

Referring in detail to the illustrative construction shown in the drawings, the cabinet 10, preferably of ornamental design, is of such a height that its upper surface 11 is a convenient working surface for a person of average height, the cabinet being otherwise in proportion so that it may be readily moved by the dentist, with the aid of casters 12, for example, from a position against a wall to a position in front of a patient seated in the usual dental operating chair. Since only the upper part of the cabinet need be utilized for the present invention, the lower thereof may contain the usual drawers 13 for the convenience of the dentist, some of which drawers may contain the X-ray pictures or other films to be displayed.

In accordance with the present invention, the projector lantern 14 has its housing 15 mounted on top of the cabinet 10 to move toward and away therefrom, as for example, by being hinged as at 16 to the rear margin of the upper cabinet surface 11, centrally of this margin from side to side of the cabinet. For the sake of appearance and also to protect the lantern, the back wall of the cabinet may be continued upwardly as at 17 for a short distance above the cabinet, a central slot 18 therein accommodating movement of the lantern just described.

The lantern 14 is in general conventional, having the incandescent electric lamp bulb 19 which may be energized by a suitable electric wiring connection made to the rear of the lantern housing as at 20. A concave reflector 21 concentrates rays of light from the filament 22 of the bulb 19 and directs them through the condensing lens 23 in the usual manner.

In accordance with the present invention, a beam of light thus directed, which is represented by the broken lines 24, is turned at right angles and diverted downwardly through the usual heat absorbing glass 15a as at 24a by the mirror 25 to pass through another condenser lens 26 and into the interior 27 of the upper part of the cabinet through an aperture 28 in the upper surface 11 of the cabinet.

It will be observed that the objective lens system of the device is mounted within the interior 27 of the cabinet directly beneath the aperture 28, this lens system comprising the usual telescoping tubular sections 29 and 30, one of which, the telescoping section 30, contains at a fixed distance apart, the usual objective lenses 31 and 32, each of which may be of the double type, as shown. The cabinet interior 27 provides a desirable camera or shadow-box effect.

Thereafter the projected light beam, which is now designated 24b, carrying the image is diverted by another mirror 33 as the beam 24c through the transparent sheet 34 of glass or other rigid transparent material. As presently described, the transparent sheet 34 forms a tiltable support for the screen itself which may be thus placed at an angle most convenient to the eye of the observer. For this purpose, the mirror 33, which may be set in a permanent inclined base 35 mounted at 35a within the lower wall 27a of the cabinet interior 27 adjacent the rear wall 27b, is inclined at an angle of approximately thirty degrees from the horizontal so as to divert the beam 24c upwardly from the horizontal toward the front of the cabinet at about this same angle to accommodate the extreme tilted position of the screen as shown in Figs. 1 and 2.

For thus tilting the screen support 34, this is shown mounted in a square wood frame 36. By countersinks 37 along the upper and lower members of the frame, the sheet 34 is received therein flush with the outer surface of the frame and abutting the side members of the frame as at 38, all of which prevents lateral movement of the sheet. The frame 36 is suspended from pivots 39 carried by the bracket 40 on the upper wall of the cabinet interior 27. At its lower end the frame 36 is pivotally connected as at 41 to one end of a toggle link 42 which is intermediately articulated at 43 and which, at its other end, is pivoted at 44 to a lug 45 secured to the bottom wall of the cabinet interior 27. There are desirably two of these toggle links, one at each side of the frame. As shown in dotted lines in Fig. 2, this toggle link may be flexed to permit the frame 36 to depend vertically within the cabinet interior 27, or it may be extended outwardly to support the frame in tilted somewhat upwardly facing position as shown in full lines in Fig. 2. A stop 45a carried by the toggle itself limits relative movement of the two parts of the toggle so that when the parts are in the position shown in full lines in Fig. 2, the articulation point 43 of the toggle is slightly below the line joining the outer ends of the toggle, so that the toggle will not flex under the weight of the frame but must be retracted manually by the operator.

Further in accordance with the present invention, the screen itself upon which the image is to be visible is formed by a web of paper 46, preferably white, which is translucent but slightly opaque in the sense that it has the opacity of readily differentiating lights and shadows. A screen of this kind is inexpensive and may be conveniently marked by the dentist (as by pencil or crayon) and may then be readily replaced, for which purpose the web is here shown continuous with a paper supply roll 47 mounted as by spools 47b to turn on a shaft 47a carried on arms 48 pivoted as at 49 on pivot plates 50 carried by the side walls of the cabinet interior 27. The arms 48 are maintained normally upright by torsion springs 51 carried by the pivots 49, one end of each spring being anchored as at 52 to a lug 53 on the pivot plate 50, and the other end, as at 54, pressing the arms 48 upwardly. By removing the screw pivots 41 at the lower end of the frame 31, this may be raised further and the roll 47 may be pulled downwardly, against the force of the springs 51 to replace the roll of paper, the screws 55 at the top of the arms being removable for this purpose, the paper roll shaft 47a coming away with the paper. The arms 48 are desirably offset inwardly as at 48a as best shown in Fig. 4, to provide ready access thereto and to the screw pivots 55, as well as providing space for the latter at the ends of the roll, this offset also providing a guard for the springs 51.

The web of paper 46 is entrained across the sheet support 34, advantageously with the assistance of pressure bars 56 and 57 at the bottom and top of the frame 36 respectively, under which the paper 46 may be led and by which the paper is held smoothly against the sheet support 34. As best shown in Fig. 3, the pressure bars 56 and 57 are mounted by arms 58 on pivots 59 engaging the side edges of the frame 36, these arms extending oppositely toward the top and bottom of the frame for their respective pressure bar and the pressure plates being urged toward the frame by torsion springs 60 which press at one end against the frame and at the other end against the arms of the pressure bars. The lower edge 61 of the lower pressure plate may serve as a tear bar so that a portion of the web 46 may be trained across the sheet support 34 and thereafter torn off leaving a new portion to serve as a screen.

When the screen frame 36 is retracted into the cabinet as shown in dotted lines in Fig. 2, this may be concealed and protected by a closure such as the double doors 62 for this part of the cabinet, these doors, which may be suitably hinged to swing laterally outwardly, when open discovering a sight opening 62a at the front of the cabinet in which the screen is visible. At this time the doors, as best shown in Figs. 1 and 2, serve to enhance the visibility of the image 63 on the screen by shutting off some of the outside light and enhancing the shadow-box effect.

It will be understood that the image 63 may be an enlargement, projected by the light beam 24b, 24c, of one of the X-ray films 64 mounted in the usual manner on a card 65 having openings or cut-outs 65a therein, for ready passage of light through the film. A card mount 65, possibly with other similar mounts, may be disposed by the dentist upon the cabinet top 11, as upon a table or desk, and the selected card may be slid across this surface until the particular film 64 desired to be displayed is in register with the aperture 28. Normally it will not be necessary to raise the projector lantern 14 for this purpose, since in accordance with the present invention, the projector housing 15 carries a beveled edge glass plate 67 on a resilient mounting 68. That is, the glass plate 67 is carried by the frame 68 which is pressed by the light coil springs 69 at each corner of the plate against another glass plate 70 countersunk into the surface 11 over the opening 28. Thus even though the weight of the lantern rests partially on the plate 67, by means of the camming action of the beveled edge 67a of the plate 67 on the edge of the card mount 65, the plate will yield upwardly sufficiently to permit the mount to slide readily thereunder and between the two plates 67 and 70, whereupon these plates maintain the film against any tendency for it to lie unevenly, while at the same time causing no interference to the passage of the light beam therethrough. The weight of the lantern, however, may be taken off the plate 67, as, for example, by a stop 16a on the lantern which contacts the rear wall 17. When one film 64 has been displayed, the card may be pushed along progressively to display the other films on the same card, or a strip film showing perhaps some educational subect with reference to the care of the teeth may be moved progressively between the plates 67 and 70 for the same purpose.

Figure 6:
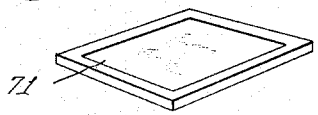
Figure 6 is a similar view of a conventional glass slide for the usual projection purposes.

It may be desired occasionally to display the usual glass picture slides such as 71, Fig. 6, and for this purpose the lower glass plate 70 may be made removable. A notch 72 in the countersunk portion 28a of the opening 28 readily permits the operator's thumb or finger to be inserted under the plate 70 and the latter raised out of position, whereupon the glass slide 71 may be inserted in its place. At this time the lantern 14 may be raised on its pivot 16 and swung backward temporarily out of the way and then lowered over the slide, the slide 71 in such case having a picture or the like thereon which is to be projected. As the slide 71 generally has greater thickness than the card mount, the countersunk portion 28a of the aperture 28 may be of an area sufficient to receive it to minimize changing the distance between the picture to be projected and the barrel 30.

Provision has been made, however, further in accordance with the present invention, for adjustability of the lens barrel 30 to accommodate a slight variation in this distance and to compensate therefor. In the present embodiment the telescoping lens tube section or barrel 30 which carries the lenses 31 and 32, at its lower end rests upon a pair of diametrically opposite fingers 73 engaging the flanged end 74 of the lens barrel 30. The fingers 73 are integral with bifurcations 75 of a cantilever member 76 hinged as at 77 on a block 78 on the side wall 79 of the cabinet interior 27. This member 76, which functions both as a bracket and as a lever, is somewhat triangular, supporting the lens barrel at one of its corners, being hinged at 77 at its other corner, and at its third corner being adjustably retained by a screw-and-socket connection 80. In this instance, as best shown in Fig. 4, the thumb screw 81, accessibly on the exterior of the cabinet, has a screwthreaded shaft 82 which passes into the interior of the cabinet being prevented from having longitudinal movement therein by keyed collars 83. The screw shaft passes threadedly through a trunnion 84 revolubly carried by a bifurcated bearing 85 of the member 76. It will be apparent that by turning the thumb screw 81 in one direction the fingers 73 will be raised to raise the lens barrel 30, while turning the thumb screw in the opposite direction will lower the fingers 73. A light compression coil spring 86 disposed between the flanged end 74 of the lens barrel 30 and a similar end 87 of the lens tube section 29 readily causes the lens barrel 30 to follow the movement of the fingers 73 in response to adjustments of the thumb screw 81. A slight elongation vertically of the bearing passage 88 for the shaft 82 of the thumb screw permits the shaft to accommodate itself vertically to the slight differences in elevation of the trunnion 84. Experiment will readily dictate the best adjustment for sharp projection.

The upper lens tube section 29 may be secured permanently in place as by screws 89 engaging the upper flange 90 of this section and passing into the cabinet wall, the aperture 28 being recessed as at 91 to accommodate this construction.

So constructed and arranged, the marked compactness and serviceability of the unitary structure will be readily apparent. At the same time, the projected image is enlarged as would otherwise not be possible without a straight line beam equal in length to the combined lengths of beams 24b and 24c.

The term film as used herein may be understood to include a film mounted on a card as shown in Fig. 5 or in the form of a glass slide shown in Fig. 6, or even a strip film mounted on a reel (not shown) as is well understood by the art.

Manifestly, the invention is not limited to details shown for purposes of illustration. Furthermore, it is not indispensable that all features of the invention be used conjointly, as various combinations and sub-combinations may be advantageously employed.

Having described the invention, what is claimed is:

1. In an image projection cabinet having an exterior substantially horizontal working surface and an aperture therein, a projector lantern mounted on said surface to swing toward and away from the said aperture, a glass plate in said aperture substantially flush with said surface whereby a film may be slid across said surface in a single plane onto said glass plate, the lantern carrying another glass plate movable with the lantern toward and away from the said surface and adapted to press the film against the first glass plate to maintain the film in said plane, an objective lens system mounted in said cabinet beneath said aperture, said lens system comprising adjustable telescoping sections, one of which is carried by the upper wall of said cabinet and the other independently carried within the cabinet, means accessible on the exterior of the cabinet for adjusting said last mentioned telescoping section, a sight opening in said cabinet at right angles to the lens system, a translucent screen in said opening, said screen being mounted on a horizontal axis adjacent the under side of the upper wall of said cabinet whereby it may be swung from a vertical position to a position inclined with respect to said sight opening and partially projected through said sight opening, means releasably maintaining the screen in said inclined position, a pair of doors for said sight opening hinged on vertical axes at the sides of said cabinet, said doors being movable to jointly form a closure for said sight opening when the screen is in vertical position and movable to positions respectively along each side of said screen when the screen is inclined, a mirror within the cabinet aligned with said lens system and arranged whereby an image from said firm may be projected onto the rear of said screen, a pair of arms mounted within the cabinet adjacent the lower wall thereof on each side of said mirror, said arms being resiliently biased to a substantially vertical position with their free ends adjacent the under side of the upper wall of said cabinet, a paper supply roll journaled on the free ends of said arms whereby the screen may be raised to horizontal position and the arms may be swung downwardly to horizontal position to replace said paper supply roll and whereby when restored to operative position a web of said paper may be drawn over said screen for drawing purposes, and means on the screen releasably retaining the said web thereon.

2. In an image projection cabinet having an exterior substantially horizontal working surface and an aperture therein, a projector lantern mounted on said surface to swing toward and away from the said aperture, a glass plate in said aperture substantially flush with said surface whereby a film may be slid across said surface in a single plane onto said glass plate, the lantern carrying another resiliently mounted glass plate movable with the lantern toward and away from said surface and adapted to resiliently press the film against the first glass plate to maintain the film in said plane, an objective lens system mounted in said cabinet beneath said aperture, said lens system comprising adjustably telescoping sections one of which is carried by the upper wall of said cabinet and the other independently carried within the cabinet, means accessible on the exterior of the cabinet for adjusting said last mentioned telescoping section, a sight opening in said cabinet at right angles to the lens system, a translucent screen in said opening, a mirror within the cabinet aligned with said lens system and arranged whereby an image from said film may be projected onto the rear of said screen, and means limiting movement of the lantern under the influence of gravity toward said working surface while permitting resilient engagement of said glass plates.

3. In an image projection cabinet having an exterior substantially horizontal working surface and an aperture therein, a projector lantern mounted on said surface to swing toward and away from the said aperture, a glass plate in said aperture substantially flush with said surface whereby an image film or the like may be slid across said surface in a single plane onto said glass plate, the lantern carrying another resiliently mounted glass plate movable with the lantern toward and away from said surface and adapted to resiliently press the film against the first glass plate to maintain the film in said plane, an objective lens system mounted in said cabinet beneath said aperture, a sight opening in said cabinet at right angles to the lens system, a translucent screen in said opening, said screen being mounted on a horizontal axis adjacent the under side of the upper wall of said cabinet whereby it may be swung from a vertical position to a position inclined with respect to said sight opening and partially projected through said sight opening, means releasably maintaining the screen in said inclined position, a pair of doors for said sight opening hinged on vertical axes at the sides of said cabinet, said doors being movable to jointly form a closure for said sight opening when the screen is in vertical position and movable to positions respectively along each side of said screen when the screen is inclined, a mirror within the cabinet aligned with said lens system and arranged whereby an image from said film may be projected onto the rear of said screen, and means limiting movement of the lantern under the influence of gravity toward said working surface while permitting resilient engagement of said glass plates.

4. In an image projection cabinet having an exterior substantially horizontal working surface and an aperture therein, a projector lantern mounted on said surface to swing toward and away from the said aperture, a glass plate in said aperture substantially flush with said surface whereby an image film or the like may be slid across said surface in a single plane onto said glass plate, the lantern carrying another resiliently mounted glass plate movable with the lantern toward and away from said surface and adapted to resiliently press the film against the first glass plate to maintain the film in said plane, an objective lens system mounted in said cabinet beneath said aperture, a sight opening in said cabinet at right angles to the lens system, a translucent screen in said opening, a mirror within the cabinet aligned with said lens system and arranged whereby an image from said film may be projected onto the rear of said screen, means limiting movement of the lantern under the influence of gravity toward said working surface while permitting resilient engagement of said glass plates, a pair of arms mounted within the cabinet adjacent the lower wall thereof on each side of said mirror, said arms being resiliently biased to a substantially vertical position with their free ends adjacent the under side of the upper wall of said cabinet, a tracing paper supply roll journaled on the free ends of said arms whereby the screen may be raised to horizontal position and the arms may be swung downwardly to horizontal position to replace said paper supply roll and whereby when restored to operative position a web of said paper may be drawn over said screen for drawing purposes, and means on the screen releasably retaining the said web thereon.

5. In an image projection cabinet having an exterior substantially horizontal working surface and an aperture therein, a projector lantern mounted on said surface to swing toward and away from the said aperture, a glass plate in said aperture substantially flush with said surface whereby the upper surface of the said glass plate is in the plane of said working surface, the lantern carrying another resiliently mounted glass plate movable with the lantern toward and away from said surface and adapted to resiliently press the film against the first glass plate to maintain the film in said plane, an objective lens system mounted in said cabinet beneath the first mentioned glass plate and aligned with said aperture, a sight opening in said cabinet at right angles to the lens system, a translucent screen in said opening, a mirror within the cabinet aligned with said lens system and arranged whereby an image from said film may be projected onto the rear of said screen and the length of the path from said first mentioned glass plate to said screen is pre-determined, and means limiting movement of the lantern under the influence of gravity toward said working surface while permitting resilient engagement of said glass plates.

HOWELL G. EVANS.
BERTEL J. KLEERUP.